(12) United States Patent
Cao et al.

(10) Patent No.: US 11,473,162 B2
(45) Date of Patent: Oct. 18, 2022

(54) CARBURIZING BEARING STEEL AND PREPARATION METHOD THEREOF

(71) Applicant: CENTRAL IRON & STEEL RESEARCH INSTITUTE, Beijing (CN)

(72) Inventors: Wenquan Cao, Beijing (CN); Feng Yu, Beijing (CN); Cunyu Wang, Beijing (CN); Haifeng Xu, Beijing (CN); Hui Wang, Beijing (CN); Da Xu, Beijing (CN); Yuqing Weng, Beijing (CN)

(73) Assignee: CENTRAL IRON & STEEL RESEARCH INSTITUTE, Beijing (CN)

( * ) Notice: Subject to any disclaimer, the term of this patent is extended or adjusted under 35 U.S.C. 154(b) by 27 days.

(21) Appl. No.: 17/186,845

(22) Filed: Feb. 26, 2021

(65) Prior Publication Data
US 2022/0017983 A1    Jan. 20, 2022

(30) Foreign Application Priority Data

Jul. 16, 2020   (CN) .................. 202010683855.4

(51) Int. Cl.
| | | |
|---|---|---|
| *C23C 8/22* | (2006.01) | |
| *C23C 8/80* | (2006.01) | |
| *C23C 8/02* | (2006.01) | |
| *C21D 9/40* | (2006.01) | |
| *C21D 1/06* | (2006.01) | |
| *C21D 1/58* | (2006.01) | |
| *C21D 6/00* | (2006.01) | |
| *C21D 8/06* | (2006.01) | |
| *C22C 38/00* | (2006.01) | |
| *C22C 38/02* | (2006.01) | |
| *C22C 38/04* | (2006.01) | |
| *C22C 38/44* | (2006.01) | |
| *C22C 38/46* | (2006.01) | |
| *C22C 38/48* | (2006.01) | |

(52) U.S. Cl.
CPC .................. *C21D 9/40* (2013.01); *C21D 1/06* (2013.01); *C21D 1/58* (2013.01); *C21D 6/004* (2013.01); *C21D 6/005* (2013.01); *C21D 6/008* (2013.01); *C21D 8/065* (2013.01); *C22C 38/002* (2013.01); *C22C 38/02* (2013.01); *C22C 38/04* (2013.01); *C22C 38/44* (2013.01); *C22C 38/46* (2013.01); *C22C 38/48* (2013.01); *C23C 8/02* (2013.01); *C23C 8/22* (2013.01); *C23C 8/80* (2013.01)

(58) Field of Classification Search
CPC .................. C23C 8/22; C23C 8/02; C23C 8/80
See application file for complete search history.

(56) References Cited

U.S. PATENT DOCUMENTS

2013/0048156 A1\*   2/2013   Hashimura .............. C21D 9/40
148/333

\* cited by examiner

*Primary Examiner* — Jessee R Roe
(74) *Attorney, Agent, or Firm* — Berenato & White, LLC

(57) ABSTRACT

The invention relates to a carburizing bearing steel and a preparation method thereof. The carburizing bearing steel of the invention comprises: 0.18~0.24 wt % of C, 0.4~0.6 wt % of Cr, 0.20~0.40 wt % of Si, 0.40~0.70 wt % of Mn, 1.6~2.2 wt % of Ni, 0.15~0.35 wt % of Mo, 0.001~0.01 wt % of S, 0.001~0.015 wt % of P, 0~0.20 wt % of Nb, 0~0.20 wt % of V and the remaining is iron, wherein the contents of Nb and V are not 0 at the same time. In the invention, an appropriate amount of Nb and V is added in combination with other elements so as to refine the grain size, inhibit the generation of large granular carbides in the steel during carburization and improve the uniformity of the microstructure of steel materials, thus further enhancing the contact fatigue life of the carburizing bearing steel.

14 Claims, 1 Drawing Sheet

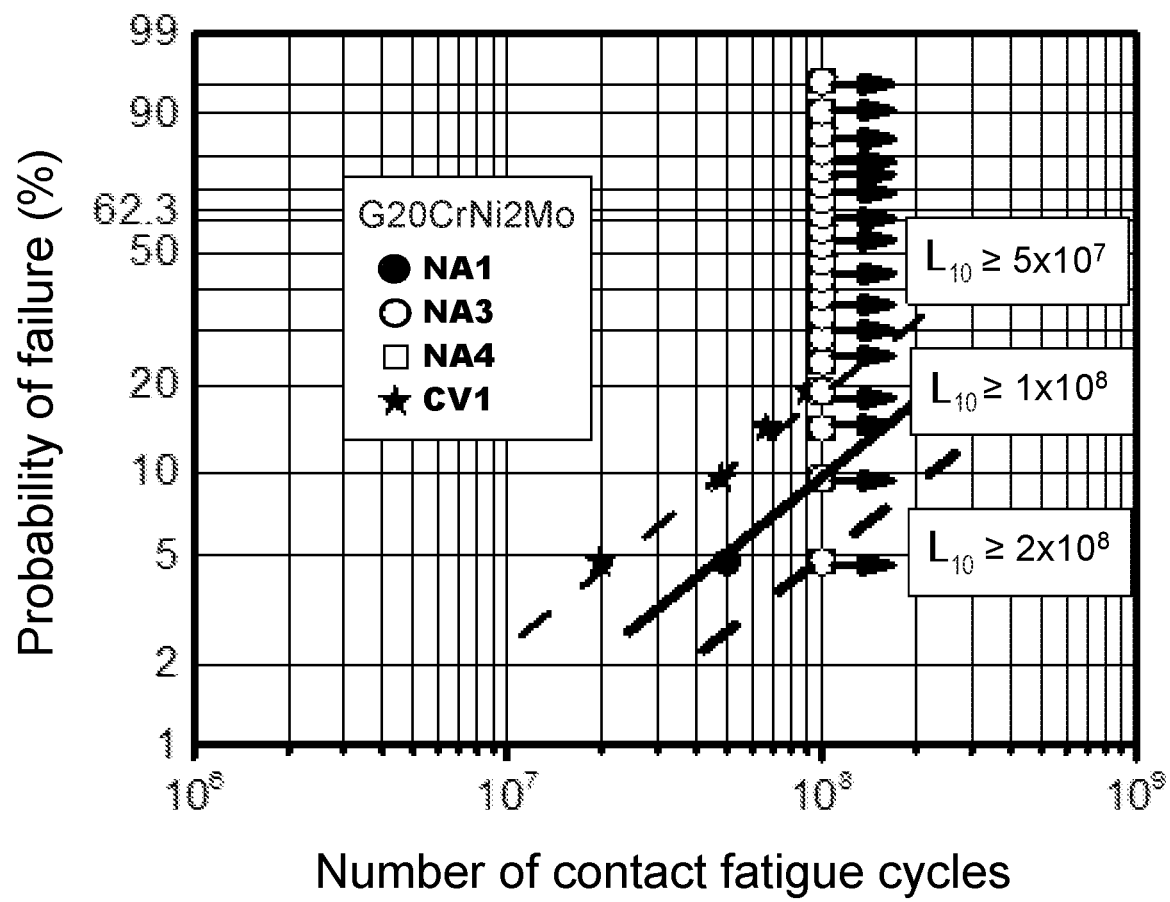

CARBURIZING BEARING STEEL AND PREPARATION METHOD THEREOF

CROSS-REFERENCE TO RELATED APPLICATIONS AND CLAIM TO PRIORITY

This application is related to Patent Application No. 202010683855.4 filed Jul. 16, 2020 in China, the entire disclosure of which is incorporated herein by reference and to which priority is claimed.

FIELD OF THE INVENTION

The invention relates to the technical field of microstructure refinement and homogenization of bearing steel, and specifically relates to a carburizing bearing steel and a method of making same.

BACKGROUND OF THE INVENTION

Bearings are an essential part of all transmissions, the fatigue life of which determines the service life and reliability of the machine and equipment. At present, carburizing bearing steel commonly used in the field of bearings with impact resistance and long service life, for example, civilian bearing steel such as G20CrNiMo, G20CrNi2Mo, and G20Cr2Ni4Mo, and military bearing steel such as M50NiL and CSS-42L, generally has low contact fatigue life and fatigue strength, which does not meet the requirements of long service life and high reliability for high-end equipment.

To improve the fatigue life of bearing steel, a lot of research on improving the contact fatigue life of bearing steel has been carried out, which mainly reduces the content of inclusions contained in the bearing steel, decreases the size of inclusions in the bearing steel, and controls the types and distribution of inclusions in the bearing steel. After nearly 30 years of cross-century development, at present, the fatigue life of the carburizing bearing steel G20CrNi2Mo refined out of furnace is still at $L_{10} \geq 4 \sim 6 \times 10^7$ times, and there has been no further progress, so the requirements of long life and high reliability for high-end equipment cannot be met. Furthermore, using an out-of-furnace refining process to further reduce the oxygen content and decrease the size and content of inclusions not only greatly increases the cost and reduces the production efficiency, but the contact fatigue life is not greatly enhanced. Therefore, high-end bearings used in railway, shield, machine tools and the like require Electro-slag Remelting (ESR) and double vacuum (Vacuum Induction Melting (VIM)+Vacuum Arc Remelting (VAR)) G20CrNi2Mo ($L_{10} \geq 5.0 \times 10^7$ times) bearing steel, which are expensive and have long contact fatigue life. However, ESR bearing steel and VIM+VAR bearing steel cannot meet the production requirements, and the cost is greatly increased.

SUMMARY OF THE INVENTION

The invention provides a carburizing bearing steel, where there is no need to rely on electro-slag remelting (ESR) and double vacuum melting (VIM+VAR), and microalloying elements are only utilized to enhance the contact fatigue life of carburizing bearing steel, thus meeting the extensive performance requirements of long life, high reliability, and low cost for bearing steel used in high-end equipment.

To realize the above purpose, the invention provides the following technical solutions:

The invention provides a carburizing bearing steel, comprising the following: 0.18~0.24 wt % of C, 0.4~0.6 wt % of Cr, 0.20~0.40 wt % of Si, 0.40~0.70 wt % of Mn, 1.6~2.2 wt % of Ni, 0.15~0.35 wt % of Mo, 0.001~0.01 wt % of S, 0.001~0.015 wt % of P, 0~0.20 wt % of Nb, 0~0.20 wt % of V and the remaining is iron, wherein the bearing steel comprises at least one of Nb and V.

Preferably, the total quantity of Nb and V is less than 0.3 wt %.

The invention provides a method of making the carburizing bearing steel in the above composition, comprising the following steps:

The preparation comprises smelting the raw materials of the carburizing bearing steel to obtain steel ingots, wherein the steel ingots have a chemical composition corresponding to the chemical composition of the carburizing bearing steel in the above composition.

The steel ingots are homogenized and then processed into bars.

The bars are successively subject to carburizing treatment, quenching, and annealing to obtain the carburizing bearing steel.

Preferably, the smelting comprises electro-slag remelting (ESR), double vacuum melting (VIM+VAR), out-of-furnace refining or vacuum induction melting.

Preferably, the temperature for homogenization is about 1100~1250° C., and the holding time is about 2~6 hours.

Preferably, the temperature for carburizing treatment is about 930° C.±10° C., and the holding time is about 6~12 hours.

Preferably, the temperature for quenching is about 820° C.±10° C., the holding time is about 0.5~2 hours, and the cooling for quenching is oil quenching to room temperature.

Preferably, the temperature for annealing is about 170° C.±10° C., the holding time is about 1~2 hours, and the cooling for annealing is air cooling to room temperature.

Preferably, the bars are processed by hot forging or hot rolling, the initial temperature for hot forging or hot rolling is about 1150~1200° C., and the temperature for finish forging or finish rolling is not lower than about 900° C.

The invention provides a carburizing bearing steel, comprising the followings: 0.18~0.24 wt % of C, 0.4~0.6 wt % of Cr, 0.20~0.40 wt % of Si, 0.40~0.70 wt % of Mn, 1.6~2.2 wt % of Ni, 0.15~0.35 wt % of Mo, 0.001~0.01 wt % of S, 0.001~0.015 wt % of P, 0~0.20 wt % of Nb, 0~0.20 wt % of V and the remaining is iron, wherein the bearing steel comprises at least one of Nb and V. In the invention, on the basis of the ingredient G20CrNi2Mo of the carburizing bearing steel, an appropriate amount of Nb and V are added in combination with other elements so as to refine the grain size, inhibit the generation of large granular carbides in the steel during carburization and improve the uniformity of the microstructure of steel materials, thus further enhancing the contact fatigue life of the carburizing bearing steel. Results from examples show that, the contact fatigue life of the carburizing bearing steel containing Nb and V in the invention has been enhanced by more than 2~4 times compared to the traditional carburizing bearing steel, which can meet the extensive performance requirements of long life, high reliability, and low cost for high-end equipment.

BRIEF DESCRIPTION OF THE DRAWING

The drawing is a diagram showing the weibull distribution of the contact fatigue life of the carburizing bearing steel in the invention compared to traditional carburizing bearing steel.

DETAILED DESCRIPTION OF THE PREFERRED EMBODIMENT(S)

The invention provides a carburizing bearing steel, comprising the following elements: 0.18~0.24 wt % of C, 0.4~0.6 wt % of Cr, 0.20~0.40 wt % of Si, 0.40~0.70 wt % of Mn, 1.6~2.2 wt % of Ni, 0.15~0.35 wt % of Mo, 0.001~0.01 wt % of S, 0.001~0.015 wt % of P, 0~0.20 wt % of Nb, 0~0.20 wt % of V and the remaining is iron, wherein the contents of Nb and V are not 0 at the same time, meaning that the bearing steel comprises at least one of Nb and V.

The carburizing bearing steel provided by the invention comprises 0.18~0.24 wt % of C, preferably 0.19~0.23 wt %, and more preferably 0.20~0.22 wt %.

The carburizing bearing steel provided by the invention comprises 0.4~0.6 wt % of Cr, preferably 0.45~0.55 wt %, and more preferably 0.55 wt %.

The carburizing bearing steel provided by the invention comprises 0.20~0.40 wt % of Si, preferably 0.25~0.35 wt %, and more preferably 0.30 wt %.

The carburizing bearing steel provided by the invention comprises 0.40~0.70 wt % of Mn, preferably 0.5~0.6 wt %, and more preferably 0.55 wt %.

The carburizing bearing steel provided by the invention comprises 1.6~2.2 wt % of Ni, preferably 1.7~2.1 wt %, and more preferably 1.8~2.0 wt %.

The carburizing bearing steel provided by the invention comprises 0.15~0.35 wt % of Mo, preferably 0.20~0.30 wt %, and more preferably 0.25 wt %.

The carburizing bearing steel provided by the invention comprises 0.001~0.01 wt % of S, preferably 0.003~0.008 wt %.

The carburizing bearing steel provided by the invention comprises 0.001~0.015 wt % of P, preferably 0.005~0.010 wt %.

The carburizing bearing steel provided by the invention comprises 0~0.20 wt % of Nb, preferably 0.04~0.20 wt %, and more preferably 0.08~0.15 wt %.

The carburizing bearing steel provided by the invention comprises 0~0.20 wt % of V, preferably 0.04~0.20 wt %, and more preferably 0.08~0.15 wt %.

The carburizing bearing steel provided by the invention preferably comprises Nb and V at the same time, and the total quantity of Nb and V is preferably less than 0.3 wt %, more preferably 0.05~0.25 wt %, and most preferably 0.10~0.20 wt %.

In the invention, on the basis of the ingredient G20CrNi2Mo of the carburizing bearing steel, an appropriate amount of Nb and V are added as microalloying elements in combination with other elements so as to refine the grain size, inhibit the generation of large granular carbides in the steel during carburization and improve the uniformity of the microstructure of steel materials, thus further enhancing the contact fatigue life of the carburizing bearing steel.

The invention provides a method of preparing the carburizing bearing steel in the above composition, comprising the following steps:

The preparation comprises smelting the raw materials of the carburizing bearing steel to obtain steel ingots, wherein the steel ingots have a chemical composition corresponding to the chemical composition of the carburizing bearing steel in the above composition.

The steel ingots are homogenized and then processed into bars.

The bars are successively subject to carburizing treatment, quenching, and annealing to obtain the carburizing bearing steel.

In the invention, the preparation comprises smelting raw materials of the carburizing bearing steel to obtain steel ingots. In the invention, the smelting is preferably electro-slag remelting (ESR), double vacuum melting (VIM+VAR), out-of-furnace refining or vacuum induction melting. To reduce the production cost, the invention further preferably employs out-of-furnace refining or vacuum induction melting. The invention has no special requirement on the process of smelting, any processes that are well known in the art such as electro-slag remelting (ESR), double vacuum melting (VIM+VAR), out-of-furnace refining or vacuum induction melting, can be used. The smelting of the invention is suitable for a converter, an electric furnace, or an induction furnace. In the invention, the steel ingots have a chemical composition corresponding to the chemical composition of the carburizing bearing steel in the above composition. The invention has no special requirements on the types and sources of various preparation raw materials, as long as they meet the requirement on the ingredients of the steel ingots. In the invention, smelting is carried out so that the oxygen content in the bearing steel is no higher than 20 ppm and the size of large granular inclusions (DS) is ≤40 microns.

In the invention, after the steel ingots are obtained, they are homogenized and then processed into bars.

In the invention, the temperature for homogenization is preferably about 1100~1250° C., and more preferably about 1200° C.; the holding time is preferably about 2~6 hours, and more preferably about 3~5 hours. Upon the completion of homogenization, the resulting billet is processed into bars. In the invention, the processing is preferably hot forging or hot rolling, the initial temperature for hot forging or hot rolling is preferably about 1150~1200° C., and the temperature for finish forging or finish rolling is preferably not lower than about 900° C. The invention has no special requirement on the size of the bars, as long as it is set according to the requirements on the carburizing bearing steel. In the examples of the invention, the size of the bars is ⌀60 mm. In the invention, the processed bars are preferably cooled in water to room temperature, and then subject to the subsequent steps.

In the invention, after the bars are obtained, they are successively subject to carburizing treatment, quenching, and annealing to obtain the carburizing bearing steel.

In the invention, the temperature for carburizing treatment is preferably about 930° C.±10° C., and more preferably about 930° C.; the holding time is preferably about 6~12 hours, and more preferably about 8~10 hours; in the invention, the bars after carburizing treatment are preferably cooled in oil to room temperature. The invention has no special limitation on the process of carburizing treatment, any carburizing process well known in the art can be used. Oil cooling is utilized in the invention so as to avoid the occurrence of superficial networks, which may affect the toughness and the contact fatigue performance.

Upon the completion of the carburizing treatment, the resulting bars are quenched in the invention to obtain the quenched bars.

In the invention, the temperature for quenching is preferably about 820° C.±10° C., and more preferably about 820° C.; the holding time is preferably about 0.5~2 hours, and more preferably about 1 hour; the cooling for quenching is preferably oil quenching to room temperature. The invention has no special requirement on the heating rate from room temperature to quenching temperature, and any heat-up process well known in the art can be used.

In the invention, after the quenched bars are obtained, they are annealed to obtain the carburizing bearing steel. In the invention, the temperature for annealing is preferably about 170° C.±10° C., and more preferably about 170° C.; the holding time is preferably about 1~2 hours, and more preferably about 2 hours; the cooling for annealing is preferably air cooling to room temperature. Annealing is utilized in the invention so as to relieve the quenching stress.

Quenching and annealing are utilized in the invention so as to obtain ultrafine and uniform carbides on the surface and high surface hardness after carburizing, which are beneficial to enhancing the contact fatigue life of the bearing steel.

The carburizing bearing steel provided by the invention and the method of preparing same is illustrated in detail below in combination with the following examples, which are not construed as the limitation on the protection scope of the invention.

Example 1

The steel of the invention is smelted in a laboratory vacuum induction melting furnace, and casted into round ingots of 50 kg. 5 furnaces of steel are totally smelted for forging into rod-like samples, with the chemical ingredients shown in Table 1. NA1-NA4 steel are the carburizing bearing steel of the invention; and CV1 is the bearing steel used as the control. The steel ingots smelted in a laboratory vacuum induction melting furnace are homogenized at a high temperature of 1200° C. for 6 hours for the subsequent forging-cogging. The initial temperature for forging is 1150° C., and the temperature for finish forging is 900° C. The initial section size is 120 mm casting blank, which is radially forged into round bars with a section size of 60 mm, and then cooled in water to room temperature. The round bars with a diameter of 60 mm are subject to the carburizing treatment at 930° C. for 12 hours, and cooled in oil to room temperature; then held at 820° C. for 0.5 hours for oil quenching to room temperature; and finally held at 170° C. for 2 hours for annealing, then cooled in the air to room temperature to obtain the carburizing bearing steel. The contact fatigue test (a thrust plate test with a maximum Hertz stress of 4.5 GPa) is carried out, with the results shown in Table 2 and the FIGURE.

TABLE 1

Chemical compositions of steel of the invention and traditional steel (wt %)

| | C | Cr | Si | Mn | Ni | S | P | Mo | Nb | V |
|---|---|---|---|---|---|---|---|---|---|---|
| NA1 | 0.18 | 0.4 | 0.40 | 0.70 | 2.2 | 0.010 | 0.010 | 0.35 | 0.04 | 0.04 |
| NA2 | 0.20 | 0.5 | 0.35 | 0.50 | 1.6 | 0.010 | 0.015 | 0.15 | 0.08 | 0.20 |
| NA3 | 0.22 | 0.6 | 0.30 | 0.35 | 1.90 | 0.010 | 0.015 | 0.25 | 0.15 | — |
| NA4 | 0.24 | 0.5 | 0.20 | 0.40 | 1.90 | 0.005 | 0.010 | 0.20 | 0.20 | 0.10 |
| CV1 | 0.20 | 0.5 | 0.35 | 0.55 | 1.6 | 0.010 | 0.015 | 0.25 | — | — |

TABLE 2

Results of contact fatigue life performances of steel of the invention and traditional steel

| | NA1 | NA2 | NA3 | NA4 | CV1 |
|---|---|---|---|---|---|
| Contact fatigue life $L_{10}$ (Number of times) | ≥1.0 × 10$^8$ times | ≥2.0 × 10$^8$ times | ≥2.0 × 10$^8$ times | ≥2.0 × 10$^8$ times | ≥5.0 × 10$^7$ times |

It can be seen from Table 2 and the FIGURE, microalloying of Nb and V enhances the contact fatigue life $L_{10}$ of NA1-NA4 steel by more than 2~4 times compared with the $L_{10}$ of the traditional bearing steel smelted in the laboratory without microalloying.

The foregoing is only preferable implementation of the invention. It should be noted to persons with ordinary skills in the art that several improvements and modifications can be made without deviating from the principle of the invention, which are also considered as the protection scope of the invention.

What is claimed is:

1. A method of making carburizing bearing steel, comprising the steps of:
    smelting raw materials of the carburizing bearing steel to obtain steel ingots, wherein the steel ingots have a chemical composition corresponding to the chemical composition of the carburizing bearing steel;
    homogenizing the steel ingots and then processing them into bars;
    successively carburizing, quenching, and annealing the bars to obtain the carburizing bearing steel,
    wherein the carburizing bearing steel comprises 0.18~0.24 wt % of C, 0.4~0.6 wt % of Cr, 0.20~0.40 wt % of Si, 0.40~0.70 wt % of Mn, 1.6~2.2 wt % of Ni, 0.15~0.35 wt % of Mo, 0.001~0.01 wt % of S, 0.001~0.015 wt % of P, 0~0.20 wt % of Nb, 0~0.20 wt % of V, and the remaining is iron, and wherein the bearing steel comprises at least one of Nb and V.

2. The method according to claim 1, wherein the smelting comprises electro-slag remelting (ESR), double vacuum melting (VIM+VAR), out-of-furnace refining or vacuum induction melting.

3. The method according to claim 1, wherein a temperature for homogenization is 1100~1250° C., and a holding time is 2~6 hours.

4. The method according to claim 1, wherein a temperature for carburizing is 930° C.±10° C., and a holding time is 6~12 hours.

5. The method according to claim 1, wherein a temperature for quenching is 820° C.±10° C., a holding time is 0.5~2 hours, and the cooling for quenching is oil quenching to room temperature.

6. The method according to claim 1, wherein a temperature for annealing is 170° C.±10° C., a holding time is 1~2 hours, and the cooling for annealing is air cooling to room temperature.

7. The method according to claim 1, wherein the bars are processed by hot forging or hot rolling, an initial temperature for hot forging or hot rolling is 1150~1200° C., and a temperature for finish forging or finish rolling is not less than 900° C.

8. A method of making carburizing bearing steel, comprising the steps of:
    smelting raw materials of the carburizing bearing steel to obtain steel ingots, wherein the steel ingots have a chemical composition corresponding to the chemical composition of the carburizing bearing steel;
    homogenizing the steel ingots and then processed them into bars;
    successively carburizing, quenching, and annealing the bars to obtain the carburizing bearing steel,
    wherein the carburizing bearing steel comprises 0.18~0.24 wt % of C, 0.4~0.6 wt % of Cr, 0.20~0.40 wt % of Si, 0.40~0.70 wt % of Mn, 1.6~2.2 wt % of Ni, 0.15~0.35 wt % of Mo, 0.001~0.01 wt % of S, 0.001~0.015 wt % of P, 0~0.20 wt % of Nb, 0~0.20 wt % of V, and the remaining is iron, wherein the bearing steel comprises at least one of Nb and V, and wherein the total quantity of Nb and V is less than 0.3 wt %.

9. The method according to claim 8, wherein the smelting comprises electro-slag remelting (ESR), double vacuum melting (VIM+VAR), out-of-furnace refining or vacuum induction melting.

10. The method according to claim 8, wherein a temperature for homogenization is 1100~1250° C., and a holding time is 2~6 hours.

11. The method according to claim 8, wherein a temperature for carburizing a is 930° C.±10° C., and a holding time is 6~12 hours.

12. The method according to claim 8, wherein a temperature for quenching is 820° C.±10° C., a holding time is 0.5~2 hours, and the cooling for quenching is oil quenching to room temperature.

13. The method according to claim 8, wherein a temperature for annealing is 170° C.±10° C., a holding time is 1~2 hours, and the cooling for annealing is air cooling to room temperature.

14. The method according to claim 8, wherein the bars are processed by hot forging or hot rolling, an initial temperature for hot forging or hot rolling is 1150~1200° C., and a temperature for finish forging or finish rolling is not less than 900° C.

* * * * *